US012437645B2

(12) United States Patent
Hou

(10) Patent No.: US 12,437,645 B2
(45) Date of Patent: Oct. 7, 2025

(54) TRAFFIC WARNING METHOD AND APPARATUS, AND COMPUTER STORAGE MEDIUM

(71) Applicant: TENCENT TECHNOLOGY (SHENZHEN) COMPANY LIMITED, Shenzhen (CN)

(72) Inventor: Chen Hou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 263 days.

(21) Appl. No.: 17/973,239

(22) Filed: Oct. 25, 2022

(65) Prior Publication Data

US 2023/0049268 A1 Feb. 16, 2023

Related U.S. Application Data

(63) Continuation of application No. PCT/CN2021/119497, filed on Sep. 22, 2021.

(30) Foreign Application Priority Data

Oct. 21, 2020 (CN) ......................... 202011131088.2

(51) Int. Cl.
*G08G 1/16* (2006.01)
*G08G 1/01* (2006.01)
*G08G 1/052* (2006.01)

(52) U.S. Cl.
CPC ........... *G08G 1/164* (2013.01); *G08G 1/0112* (2013.01); *G08G 1/0129* (2013.01);
(Continued)

(58) Field of Classification Search
CPC .... G08G 1/164; G08G 1/0112; G08G 1/0129; G08G 1/0133; G08G 1/0141;
(Continued)

(56) References Cited

U.S. PATENT DOCUMENTS 5,983,161 A * 11/1999 Lemelson ............... G01S 19/11 340/436
6,223,125 B1 * 4/2001 Hall ....................... G08G 1/164 701/117
(Continued)

FOREIGN PATENT DOCUMENTS

CN 106553655 A * 4/2017 ........ B60W 30/0956
CN 110239533 A * 9/2019 ........ B60W 30/0956
(Continued)

OTHER PUBLICATIONS

W. Peng and L. Zhiqiang, "The Study of Intelligent Vehicle Anti-collision Forewarning Technology by Multi-Information Detection," 2013 Third International Conference on Intelligent System Design and Engineering Applications, Hong Kong, China, 2013, pp. 1557-1561, doi: 10.1109/ISDEA.2012.374. (Year: 2013).*
(Continued)

*Primary Examiner* — Tiffany P Young
*Assistant Examiner* — Merritt E Levy
(74) *Attorney, Agent, or Firm* — ANOVA LAW GROUP PLLC

(57) ABSTRACT

A traffic warning method and apparatus includes: obtaining driving status information of a dangerous vehicle on a target road and pavement status information of the target road; determining potential collision strength of the dangerous vehicle against a first vehicle according to driving status information of the first vehicle on the target road, the driving status information of the dangerous vehicle, and the pavement status information of the target road; correcting the potential collision strength of the dangerous vehicle against the first vehicle according to a difference between a performance parameter of the dangerous vehicle and a performance parameter of a non-dangerous vehicle on the target road; and performing traffic warning according to the cor-
(Continued)

rected potential collision strength of the dangerous vehicle against the first vehicle.

19 Claims, 6 Drawing Sheets

(52) U.S. Cl.
CPC ......... *G08G 1/0133* (2013.01); *G08G 1/0141* (2013.01); *G08G 1/0145* (2013.01); *G08G 1/052* (2013.01); *G08G 1/166* (2013.01)

(58) Field of Classification Search
CPC ...... G08G 1/0145; G08G 1/052; G08G 1/166; G08G 1/163; G08G 1/0104; Y02T 10/40
USPC ............................................................ 701/301
See application file for complete search history.

(56) References Cited

U.S. PATENT DOCUMENTS

| | | | | |
|---|---|---|---|---|
| 6,405,132 | B1 * | 6/2002 | Breed | G01S 19/48 701/45 |
| 10,532,696 | B1 * | 1/2020 | Stählin | G08G 1/166 |
| 2012/0068859 | A1 * | 3/2012 | Mochizuki | B60R 21/0134 340/903 |
| 2013/0083679 | A1 * | 4/2013 | Krishnaswamy | G08G 1/093 370/252 |
| 2015/0161894 | A1 * | 6/2015 | Duncan | B60W 30/00 701/1 |
| 2016/0071417 | A1 * | 3/2016 | Lewis | G08G 1/162 701/301 |
| 2017/0034667 | A1 * | 2/2017 | Kumabe | G08G 1/096758 |
| 2017/0046952 | A1 * | 2/2017 | Yang | G06F 18/22 |
| 2020/0168099 | A1 * | 5/2020 | Yamaguchi | G08G 1/09626 |
| 2020/0186979 | A1 * | 6/2020 | Liu | H04W 40/248 |
| 2020/0336541 | A1 * | 10/2020 | Naderi Alizadeh | H04L 67/12 |
| 2022/0028258 | A1 * | 1/2022 | Sadano | G08G 1/056 |

FOREIGN PATENT DOCUMENTS

| | | | |
|---|---|---|---|
| CN | 111179624 | A | 5/2020 |
| CN | 111612378 | A | 9/2020 |
| CN | 111739288 | A | 10/2020 |
| CN | 112270832 | A | 1/2021 |
| GB | 2421828 | A | 7/2006 |

OTHER PUBLICATIONS

H. Takahashi, D. Ukishima, K. Kawamoto and K. Hirota, “A Study on Predicting Hazard Factors for Safe Driving,” in IEEE Transactions on Industrial Electronics, vol. 54, No. 2, pp. 781-789, Apr. 2007, doi: 10.1109/TIE.2007.891651. (Year: 2007).*

The World Intellectual Property Organization (WIPO) International Search Report for PCT/CN2021/119497 Nov. 25, 2021 7 Pages (including translation).

* cited by examiner

TRAFFIC WARNING METHOD AND APPARATUS, AND COMPUTER STORAGE MEDIUM

RELATED APPLICATION(S)

This application is a continuation application of PCT Patent Application No. PCT/CN2021/119497 filed on Sep. 22, 2021, which claims priority to Chinese Patent Application No. 2020111310882, entitled "TRAFFIC WARNING METHOD AND APPARATUS, AND COMPUTER STORAGE MEDIUM" filed on Oct. 21, 2020, all of which are incorporated by reference in entirety.

FIELD OF THE TECHNOLOGY

The present disclosure relates to the field of vehicle-to-everything technologies, and in particular, to a traffic warning technology.

BACKGROUND

"Buses of two types and dangerous vehicles of one type" refer to chartered vehicles engaged in tourism, three class-above bus lines, and special road vehicles for transporting hazardous chemicals, fireworks and firecrackers, and civilian explosives. Once the vehicles of these types are involved in traffic accidents, consequences thereof are serious. How to perform effective warning on the vehicles of these types is a problem to be solved to realize safer assisted driving.

SUMMARY

Embodiments of the present disclosure provide a traffic warning method and apparatus, and a computer storage medium, which can perform effective warning on a dangerous vehicle, and improve the reliability of safe assisted driving.

In one aspect, the present disclosure provides a traffic warning method, performed by a computing device. The method includes: obtaining driving status information of a dangerous vehicle on a target road and pavement status information of the target road; determining potential collision strength of the dangerous vehicle against a first vehicle according to driving status information of the first vehicle on the target road, the driving status information of the dangerous vehicle, and the pavement status information of the target road; correcting the potential collision strength of the dangerous vehicle against the first vehicle according to a difference between a performance parameter of the dangerous vehicle and a performance parameter of a non-dangerous vehicle on the target road; and performing traffic warning according to the corrected potential collision strength of the dangerous vehicle against the first vehicle. The method can perform effective warning on the dangerous vehicle, and improve the reliability of safe assisted driving.

In another aspect, the present disclosure provides a traffic warning method. The method includes: transmitting, by a second vehicle on a target road, a performance parameter of the second vehicle to a first vehicle on the target road, where the performance parameter of the second vehicle is used for assisting the first vehicle to perform traffic warning; and the performance parameter includes at least one of the following: positioning accuracy of the second vehicle, a communication delay of the second vehicle relative to the first vehicle, driving status information of the second vehicle and a total information amount of the driving status information, or a used duration and a specified service life of the second vehicle.

In yet another aspect, the present disclosure provides a traffic warning apparatus, comprising: a memory storing computer program instructions; and a processor coupled to the memory and configured to execute the computer program instructions and perform: obtaining driving status information of a dangerous vehicle on a target road and pavement status information of the target road; determining potential collision strength of the dangerous vehicle against a first vehicle according to driving status information of the first vehicle on the target road, the driving status information of the dangerous vehicle, and the pavement status information of the target road; correcting the potential collision strength of the dangerous vehicle against the first vehicle according to a difference between a performance parameter of the dangerous vehicle and a performance parameter of a non-dangerous vehicle on the target road; and performing traffic warning according to the corrected potential collision strength of the dangerous vehicle against the first vehicle.

In yet another aspect, the present disclosure provides a non-transitory computer-readable storage medium storing computer program instructions executable by at least one processor to perform: obtaining driving status information of a dangerous vehicle on a target road and pavement status information of the target road; determining potential collision strength of the dangerous vehicle against a first vehicle according to driving status information of the first vehicle on the target road, the driving status information of the dangerous vehicle, and the pavement status information of the target road; correcting the potential collision strength of the dangerous vehicle against the first vehicle according to a difference between a performance parameter of the dangerous vehicle and a performance parameter of a non-dangerous vehicle on the target road; and performing traffic warning according to the corrected potential collision strength of the dangerous vehicle against the first vehicle.

In yet another aspect, the present disclosure provides a computing device. The computing device includes: a communication bus, a processor, a communication interface, and a memory, the processor, the communication interface, and the memory being connected with each other through the communication bus, the memory being configured to store program code, and the processor being configured to invoke the program code to perform the method described in the above first aspect or second aspect.

In yet another aspect, the present disclosure provides a traffic warning system. The system includes: the traffic warning apparatus in the third aspect and the traffic warning apparatus in the fourth aspect; or the computing device in the fifth aspect and a computing device in the sixth aspect.

According to the traffic warning method in the embodiments of the present disclosure, potential collision strength of a dangerous vehicle against another vehicle can be estimated according to driving status information of the dangerous vehicle, the potential collision strength of the dangerous vehicle against another vehicle can be further corrected according to a difference between a performance parameter of the dangerous vehicle and a performance parameter of a non-dangerous vehicle, and traffic warning can be performed according to the corrected potential collision strength of the dangerous vehicle. In this way, the warning accuracy can be improved, and the false alarm rate can be reduced, thereby realizing effective warning on the dangerous vehicle, and improving the reliability of safe assisted driving.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

To make the objectives, technical solutions, and advantages of the embodiments of the present disclosure clearer, the following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person skilled in the art based on the embodiments of the present disclosure without creative efforts shall fall within the protection scope of the present disclosure.

To make the embodiments of the present disclosure more comprehensible, the following first describes a system architecture applicable to the embodiments of the present disclosure.

Figure 1:
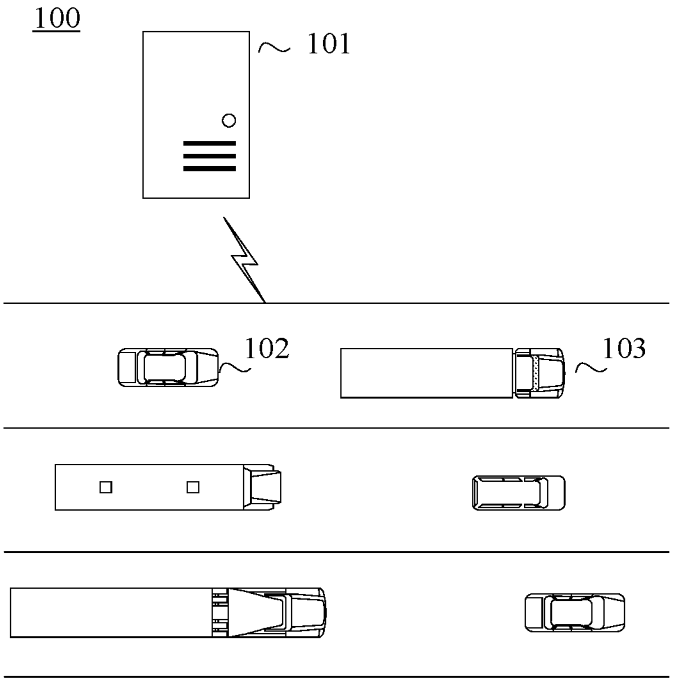
FIG. 1 is a schematic structural block diagram of a system according to certain embodiment(s) of the present disclosure.

FIG. 1 is a schematic diagram of a system architecture applicable to a traffic warning method according to an embodiment of the present disclosure. As shown in FIG. 1, a system architecture 100 may include one or more servers 101 and a plurality of vehicles such as an ordinary vehicle (or referred to as a non-dangerous vehicle) 102 and a dangerous vehicle 103. The vehicles in the system architecture 100 may communicate with the server 101. For example, communication is performed in a manner of a wired or wireless communication link or an optical fiber cable.

The dangerous vehicle 103 may be, for example, one of "buses of two types and dangerous vehicles of one type", or may be another vehicle whose dangerous degree is higher than that of an ordinary vehicle. The present disclosure is not limited thereto.

Quantities of vehicles and servers included in the system architecture 100 in FIG. 1 are merely exemplary. The system architecture 100 may include any number of vehicles and servers.

The server 101 may be a server providing related traffic services, for example, the server 101 may obtain vehicle data on a road, and analyze the vehicle data to perform traffic warning, path planning, and the like. For example, an analysis result may be displayed on any platform or product configured to present real-time traffic conditions, such as a digital large screen, a map service application, taxi-hailing software, a logistics scheduling systems, or the like; or information of a dangerous vehicle around a vehicle may also be dynamically displayed on a terminal (such as, an in-vehicle computer) of a user in time, which is convenient for the user to perform path planning.

The user may interact with the server 101 by using the terminal, to receive or transmit a message and the like. For example, a related client may be installed and run on the terminal. The client (such as a map service client) is a program corresponding to the server 101 and providing related traffic services for the user. The related traffic services include, but are not limited to: a potential collision strength analysis of the vehicle, traffic warning, and path planning.

For example, the client includes, but is not limited to: an application that run locally, a function that run on a web browser (also referred to as Web App), a mini program embedded in email, a mini program embedded in instant messaging client software, a function embedded in another application (such as an application account that a developer or merchant applies for based on a public platform), and the like. For the client, the server 101 runs a corresponding server-side program to provide corresponding services, such as database services, data calculation, and decision execution. By using the terminal, the user can perform operations related to traffic services on the corresponding platform, for example, perform operations such as obtaining potential collision strength of a dangerous vehicle, and path planning.

The terminal in the embodiments of the present disclosure may include, but is not limited to, any in-vehicle or hand-held electronic product based on an intelligent operating system, which may interact with the user through input components such as a keyboard, a virtual keyboard, a touch pad, a touch screen, and a voice control device. The terminal may be, for example, a smartphone, a tablet computer, or a personal computer. The intelligent operating system includes, but is not limited to, any operating system that enriches device functions by providing mobile devices with mobile applications, such as Android, IOS, and Windows Phone.

As described above, dangerous degrees of the "buses of two types and dangerous vehicles of one type" are higher than those of ordinary vehicles, and the vehicles of these types cause serious results once traffic accidents are happened. Therefore, how to perform effective warning on the vehicles of these types is a problem to be resolved currently.

In view of this, the embodiments of the present disclosure provide a technical solution: driving status information of a dangerous vehicle can be obtained, potential collision strength of the dangerous vehicle can be estimated based on the driving status information, the potential collision strength of the dangerous vehicle can be further corrected according to a difference between a performance parameter of the dangerous vehicle and a performance parameter of a non-dangerous vehicle, and traffic warning can be performed according to the corrected potential collision strength of the dangerous vehicle. In this way, effective warning on the dangerous vehicle is realized, the warning accuracy is improved, and the false alarm rate is reduced.

Figure 2:
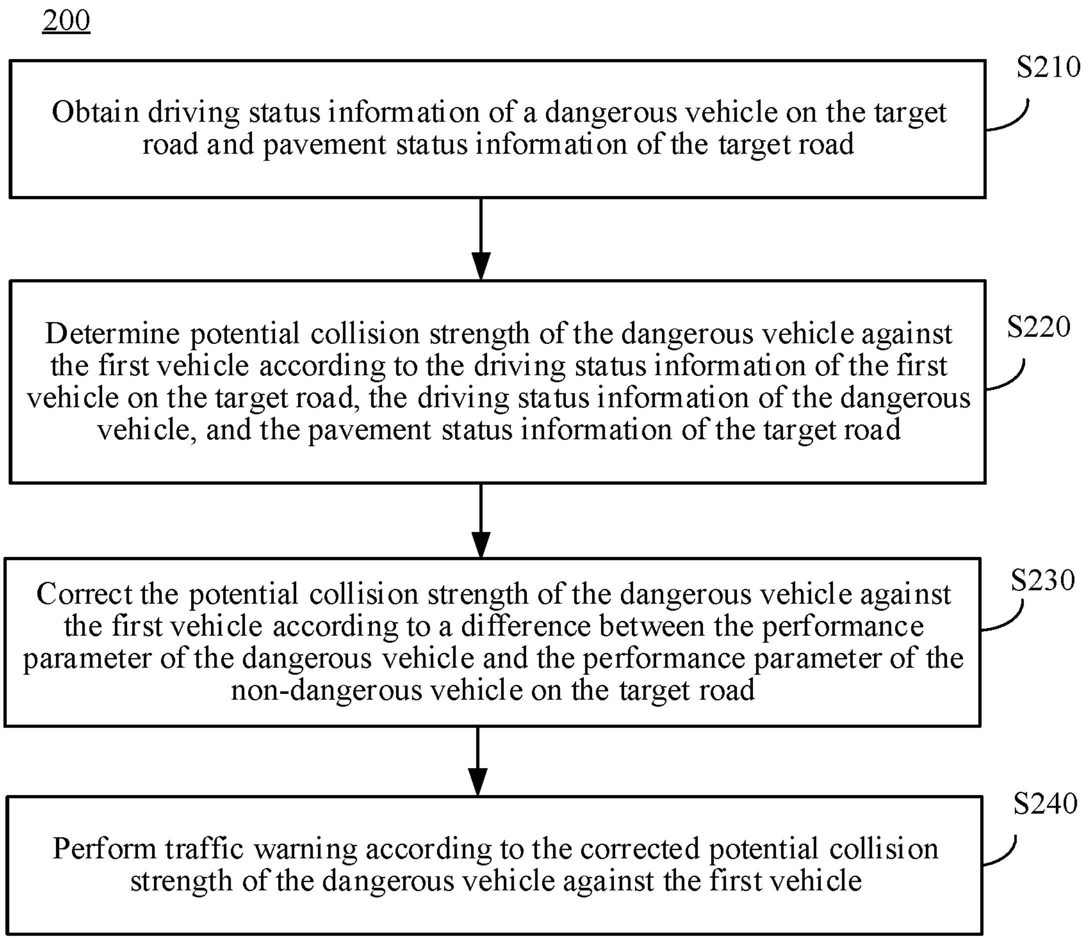
FIG. 2 is a schematic flowchart of a traffic warning method according to certain embodiment(s) of the present disclosure.

FIG. 2 is a schematic flowchart of a traffic warning method 200 according to an embodiment of the present disclosure. The method 200 may be implemented based on the system architecture shown in FIG. 1.

This embodiment of the present disclosure may be applied to any scenario in which a dangerous vehicle drives on a road and effective warning is performed on the dangerous vehicle. By way of example but not limitation, this embodiment of the present disclosure may be applied to any application (App) oriented to customers (To C), such as a mini program in an instant messaging application, or an in-vehicle application; or may be applied to any product oriented to businesses (To B), such as a road operation surveillance product, or a road management cloud platform.

Hereinafter, the traffic warning method 200 is described from the perspective of a first vehicle on a target road. In certain embodiment(s), an execution entity of the method 200 may be a computing device on the first vehicle, such as an in-vehicle computer; or may be a computing device capable of performing information interaction with the first vehicle, such as a backend server on a road management platform. The backend server on the road management platform may obtain related information for traffic warning, perform traffic warning according to the information, and transmit warning information to the first vehicle to prompt a driver of the first vehicle to drive carefully when or in response to a determination that the warning information is outputted. The present disclosure is not limited thereto.

Referring to FIG. 2, the method 200 may include at least some of the following steps.

S210. Obtain driving status information of a dangerous vehicle on the target road and pavement status information of the target road.

In some embodiments, the obtaining driving status information of a dangerous vehicle on the target road includes: receiving the driving status information transmitted by the dangerous vehicle.

In certain embodiment(s), when driving to the target road, the dangerous vehicle may transmit the driving status information of the dangerous vehicle to another vehicle on the target road. For example, the dangerous vehicle may transmit the driving status information of the dangerous vehicle through a communication protocol among vehicles, such as a vehicle-to-everything (V2X) protocol.

By way of example but not limitation, the driving status information of the dangerous vehicle includes at least one of the following: mass, a speed, an acceleration, or a position of the dangerous vehicle.

The position of the dangerous vehicle may be, for example, position information determined by a global positioning system (GPS), or may be position information determined by using other manners. The present disclosure is not limited thereto.

In some embodiments, the obtaining pavement status information of the target road includes: obtaining the pavement status information of the target road by a road surveillance device such as a road camera.

By way of example but not limitation, the pavement status information of the target road includes at least one of the following:

pavement viscosity, a pavement friction coefficient, road curvature, or visibility of the target road.

Because traffic accidents caused by dangerous vehicles are usually serious, a vehicle warning system of the embodiments of the present disclosure aims for the accuracy, real-time performance, integrity, and service life of the obtained data of the dangerous vehicle.

In some embodiments of the present disclosure, the method 200 further includes: determining a performance parameter of the dangerous vehicle on the target road.

In certain embodiment(s), in some embodiments, the performance parameter of the dangerous vehicle includes at least one of the following: positioning accuracy of the dangerous vehicle, a communication delay of the dangerous vehicle relative to the first vehicle, integrity of the driving status information of the dangerous vehicle obtained by the first vehicle, or a health degree of the dangerous vehicle.

In some embodiments of the present disclosure, the method 200 further includes: determining a performance parameter of a non-dangerous vehicle on the target road.

In certain embodiment(s), in some embodiments, the performance parameter of the non-dangerous vehicle includes at least one of the following: positioning accuracy of the non-dangerous vehicle, a communication delay of the non-dangerous vehicle relative to the first vehicle, or integrity of driving status information of the non-dangerous vehicle obtained by the first vehicle.

The following describes manners for determining the performance parameters.

1. Positioning Accuracy

After the dangerous vehicle drives to the target road, the dangerous vehicle may transmit the positioning accuracy of the dangerous vehicle to another vehicle on the target road. The positioning accuracy may be positioning accuracy of a GPS positioning apparatus installed on the dangerous vehicle. For example, the positioning accuracy may be stored in a memory of the dangerous vehicle, and may be obtained by reading the memory. The positioning accuracy of the dangerous vehicle may be recorded as $g_{dangerous}$.

After the non-dangerous vehicle drives to the target road, the non-dangerous vehicle may also transmit the positioning accuracy of the non-dangerous vehicle to another vehicle on the target road, and a specific implementation thereof is similar. For ease of distinguishing, the positioning accuracy of the non-dangerous vehicle may be recorded as $g_{general}$.

2. Communication Delay

In certain embodiment(s), after the dangerous vehicle drives to the target road, the first vehicle may obtain a communication delay between the dangerous vehicle and the first vehicle.

Figure 3:
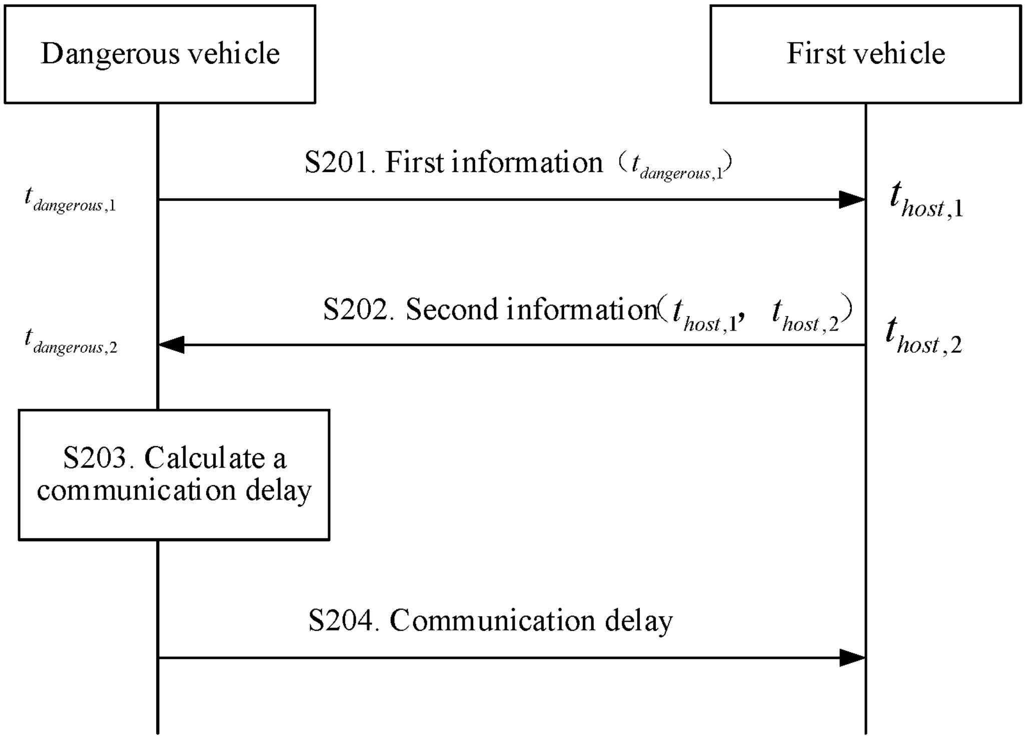
FIG. 3 is a schematic interaction diagram of a manner for determining a communication delay according to certain embodiment(s) of the present disclosure.

The following describes a process of determining the communication delay between the dangerous vehicle and the first vehicle with reference to FIG. 3.

S201. The dangerous vehicle transmits first information to the first vehicle, where the first information includes a first timestamp.

In some embodiments, the first information may include the GPS positioning accuracy of the dangerous vehicle, and the first timestamp may be a moment when the dangerous vehicle transmits the positioning accuracy of the dangerous vehicle. In certain embodiment(s), the first timestamp may be a display time of an in-vehicle clock of the dangerous vehicle when the dangerous vehicle transmits the positioning accuracy of the dangerous vehicle, and is recorded as $t_{dangerous,1}$.

After the first information is received, the first vehicle records a moment when the first vehicle receives the first information as a second timestamp $t_{host,1}$.

S202. The first vehicle transmits second information to the dangerous vehicle. A transmitting moment of the second information is recorded as a third timestamp $t_{host,2}$. The second information includes a second timestamp $t_{host,1}$ and a third timestamp $t_{host,2}$; or may include a difference $t_{host,2}-t_{host,1}$ between the second timestamp $t_{host,1}$ and the third timestamp $t_{host,2}$. The difference may be understood as a processing time of the first vehicle for the first information.

After the second information is received, the dangerous vehicle records a moment when the first vehicle receives the second information as a fourth timestamp $t_{dangerous,2}$.

S203. The dangerous vehicle determines a communication delay $\Delta t_{dangerous}$ between the dangerous vehicle and the first vehicle according to the first timestamp, the second timestamp, the third timestamp, and the fourth timestamp. In certain embodiment(s), $\Delta t_{dangerous}=((t_{dangerous,2}-t_{host,2})+(t_{host,1}-t_{dangerous,1}))/2$.

S204. The dangerous vehicle transmits the communication delay $\Delta t_{dangerous}$ to the first vehicle.

Further, when evaluating a driving risk of the first vehicle, the dangerous vehicle refers to the communication delay $\Delta t_{dangerous}$, so that the evaluation of the driving risk can be prevented from being affected due to the clock of the dangerous vehicle being out of sync with a clock of the first vehicle.

The first vehicle may also obtain a communication delay $\Delta t_{general}$ between the non-dangerous vehicle and the first vehicle according to the similar manner in FIG. 3.

When the process of determining the communication delays is performed by a computing device on the first vehicle, a calculated delay is a communication delay between the first vehicle and another vehicle. In some other embodiments, when the process of determining the communication delays or the execution process of the method 200 is performed by a third-party computing device, the third-party computing device may perform information interaction with the computing device on the first vehicle, and the determined communication delay is a communication delay between the third-party computing device and the first vehicle. Correspondingly, the communication delay is modified, to reduce the communication delay between the third-party computing device and the first vehicle.

3. Integrity of Driving Status Information

In certain embodiment(s), after driving to the target road, the dangerous vehicle may transmit the driving status information of the dangerous vehicle to another vehicle (such as the first vehicle) on the target road, and a specific communication manner thereof refers to the above descriptions. At the same time, the dangerous vehicle also informs another vehicle of a total information amount of the transmitted information. The total information amount may be measured in bits, and is recorded as $n_{dangerous}$.

In some implementations, the driving status information of the dangerous vehicle may be obtained from a dashboard of the vehicle.

Further, after the driving status information transmitted by the dangerous vehicle is received, the first vehicle counts the total information amount of the received driving status information, which may be measured in bits as well, and is recorded as $n_{host}$. Therefore, the first vehicle may determine the integrity of the received driving status information of the dangerous vehicle, and record the integrity as $\Delta n_{dangerous}=n_{host}/n_{dangerous}$.

The first vehicle may also obtain the information integrity of the driving status information of the non-dangerous vehicle according to the similar manner, and record the integrity as $\Delta n_{general}$.

4. Health Degree of a Vehicle

In certain embodiment(s), the dangerous vehicle may transmit service life related information to another vehicle on the target road, for example, a used duration (recorded as $T_{already}$) and a specified service life (recorded as $I_{specified}$) of the dangerous vehicle. The specified service life may be determined by a manufacturer, may be obtained from the manufacturer, or may be an average service life of similar vehicles. The vehicle that receives the service life related information of the dangerous vehicle may evaluate the health degree of the dangerous vehicle according to the service life related information of the dangerous vehicle.

Because a service life of a vehicle is usually determined by service lives of various electronic components forming the vehicle and a service life of an electronic product confirms to exponential distribution, the service life of the dangerous vehicle may also be considered as confirming to the exponential distribution. In an implementation, assuming that a health degree of the dangerous vehicle when just leaving a factory is 1, a current "health" degree $P_{dangerous}$ of the dangerous vehicle may be expressed as $P_{dangerous}=e^{-T_{already}/T_{specified}}$, that is, a ratio of a probability that the dangerous vehicle can normally work currently for a first duration to a probability that the dangerous vehicle can normally work when just leaving the factory, where the first duration may be any duration.

S220. Determine potential collision strength of the dangerous vehicle against the first vehicle according to the driving status information of the first vehicle on the target road, the driving status information of the dangerous vehicle, and the pavement status information of the target road.

In some embodiments, the driving status information of the first vehicle, the driving status information of the dangerous vehicle, and the pavement status information of the target road may be all inputted to a driving risk calculation model, and the potential collision strength of the dangerous vehicle against the first vehicle is calculated by using the driving risk calculation model, and is recorded as $E_{initial}$.

In some embodiments, the first vehicle may also determine the potential collision strength of the non-dangerous vehicle against the first vehicle according to the driving status information of the first vehicle, the driving status information of the non-dangerous vehicle, and the pavement status information of target road.

For example, the driving status information of the first vehicle, the driving status information of the non-dangerous vehicle, and the pavement status information of target road may be all inputted to the driving risk calculation model, and the potential collision strength of the non-dangerous vehicle against the first vehicle is calculated by using the driving risk calculation model, and is recorded as $E_{general}$.

The manner for obtaining the driving status information of the non-dangerous vehicle may refer to the manner for obtaining the driving status information of the dangerous vehicle. For brevity, details are not described herein again.

When the potential collision strength between the vehicles by using the driving risk calculation model, calculation manners shown in the following two formulas may be used exemplarily.

$$SPE_{R-aj} = \frac{GR_a R_j M_a M_j}{(k_1 - 1)|\overrightarrow{r_{aj}}|^{k_1 - 1}} + \frac{LT_a R_a R_j M_j (1 + DR_j)}{k_2 + 1}\left(\frac{D}{2} - |\overrightarrow{r_{aj}}|\right)^{k_2 + 1}$$

$$SPE_{V-bj} = \frac{GR_b R_j M_b M_j k_3}{(k_1 - 1)|\overrightarrow{r_{aj}}|^{k_1 - 1}}\left(\frac{\left(k_3 - |\overrightarrow{v_b}|\cos\theta_b\right)^{1-k_1}}{k_3 - |\overrightarrow{v_b}|}\right)^{\frac{1}{k_1}}$$

where, a first item of the first formula, namely, $$\frac{GR_a R_j M_a M_j}{(k_1 - 1)|\overrightarrow{r_{aj}}|^{k_1 - 1}},$$

represents collision strength between an object that is static but may collide the first vehicle and the first vehicle; and a second item of the first formula, namely, $$\frac{LT_a R_a R_j M_j (1 + DR_j)}{k_2 + 1}\left(\frac{D}{2} - |\overrightarrow{r_{aj}}|\right)^{k_2 + 1},$$

represents a driving risk brought to the first vehicle by an object that is static and does not collide the first vehicle but affects a driving risk of the first vehicle.

The second formula represents a driving risk between an object that is moving and may collide the first vehicle and the first vehicle.

That is, objects around a vehicle may be divided into two types: static objects and moving objects. The static objects may be further divided into two types: a first type is an object that is static but may collide the vehicle, and a second type is an object that is static and does not collide the vehicle but affects the vehicle to collide other objects. Driving risks caused by the static objects and the moving objects may be calculated respectively by using the first formula and the second formula.

In the above two formula, M represents mass, r represents a distance, V represents a speed, $\theta_b$ represents a driving direction, GR represents a driver risk factor, and R (regardless of the subscript) represents a pavement factor, where the pavement factor may include viscosity, humidity, slope, temperature, and the like of the pavement. D represents a width of the pavement. $LT_a$ represents a type of a road sign, for example, being set to 1, 2, 3, and 4. A greater pressure brought to the driver by the road sign indicates a larger value of $LT_a$. k1, k2, and k3 are all constants, for example, k1=3, k2=1, and k3=speed of light.

In this embodiment of the present disclosure, the driving risk may refer to a collision probability between the vehicles or the potential collision strength between the vehicles, that is, the potential collision strength in this embodiment of the present disclosure may also be replaced with the driving risk, the collision probability, or another equivalent evaluation parameter.

Because the performance parameter of the dangerous vehicle, such as the positioning accuracy, the communication delay, the information integrity, and the service life, may each bring an additional driving risk to the vehicle, the method 200 in this embodiment of the present disclosure further includes the following steps.

S230. Correct the potential collision strength of the dangerous vehicle against the first vehicle according to a difference between the performance parameter of the dangerous vehicle and the performance parameter of the non-dangerous vehicle on the target road.

In this embodiment of the present disclosure, the performance parameter of the non-dangerous vehicle used for correcting the potential collision strength of the dangerous vehicle against the first vehicle may be determined according to the performance parameter of the non-dangerous vehicle driving on the target road, for example, may be a performance parameter of one non-dangerous vehicle driving on the target road, or an average value of performance parameters of non-dangerous vehicles driving on the target road. Alternatively, the performance parameter of the non-dangerous vehicle may also be obtained from a road surveillance server, for example the road surveillance server may count and average performance parameters of non-dangerous vehicles historically driving on the road, to obtain the performance parameter of the non-dangerous vehicle. The manner for obtaining the performance parameter of the non-dangerous vehicle is not limited in the present disclosure.

Because there is the difference between the performance parameter of the dangerous vehicle and the performance parameter of the non-dangerous vehicle, there is a difference between the driving risks brought by the two. The potential collision strength of the dangerous vehicle against the first vehicle is corrected according to the difference between the performance parameter of the dangerous vehicle and the performance parameter of the non-dangerous vehicle on the target road, so that the accuracy of the evaluated potential collision strength can be improved, and the warning accuracy can be further improved.

In an implementation, the potential collision strength of the dangerous vehicle against the first vehicle may be corrected according to at least one of a difference between the positioning accuracy of the dangerous vehicle and the positioning accuracy of the non-dangerous vehicle, a difference between the communication delay of the dangerous vehicle and the communication delay of the non-dangerous vehicle respectively relative to the first vehicle, a difference between the integrity of the driving status information of the dangerous vehicle and the integrity of the driving status information of the non-dangerous vehicle, or the health degree of the dangerous vehicle.

For example, the potential collision strength of the dangerous vehicle against the first vehicle may be corrected according to the following formula:

$$E_{dangerous} = \frac{E_{initial}}{p_{dangerous}} \cdot \frac{g_{general}}{g_{dangerous}} \cdot \frac{\Delta t_{general}}{\Delta t_{dangerous}} \cdot \frac{\Delta n_{general}}{\Delta n_{dangerous}}$$

where, $E_{dangerous}$ is the corrected potential collision strength of the dangerous vehicle against the first vehicle, $E_{initial}$ is the potential collision strength of the dangerous vehicle against the first vehicle before correction, $p_{dangerous}$ is the health degree of the dangerous vehicle, $g_{general}$ is the GPS positioning accuracy of the non-dangerous vehicle, $g_{dangerous}$ is the positioning accuracy of the dangerous vehicle, $\Delta t_{general}$ is the communication delay of the non-dangerous vehicle relative to the first vehicle, $\Delta t_{dangerous}$ is the communication delay of the dangerous vehicle relative to the first vehicle, $\Delta n_{general}$ is the information integrity of the driving status information of the non-dangerous vehicle, and $\Delta n_{dangerous}$ is the information integrity of the driving status information of the dangerous vehicle.

S240. Perform traffic warning according to the corrected potential collision strength of the dangerous vehicle against the first vehicle.

In some embodiments, if the corrected potential collision strength of the dangerous vehicle against the first vehicle is greater than a first threshold, warning information is outputted; otherwise, the warning information is not outputted.

In certain embodiment(s), the first threshold may be an average value, a minimum value, or the like of potential collision strength of dangerous vehicles against the first vehicle historically. When potential collision strength of a dangerous vehicle around the first vehicle against the first vehicle is greater than the first threshold, a user in the vehicle may be prompted that "the potential collision strength brought to this vehicle by the dangerous vehicle has exceeded a historical average level, and please drive carefully".

In some embodiments of the present disclosure, the performing traffic warning according to the corrected potential collision strength of the dangerous vehicle against the first vehicle includes: performing traffic warning according to a difference between the corrected potential collision strength of the dangerous vehicle against the first vehicle and the potential collision strength of the non-dangerous vehicle against the first vehicle and a difference between a historical average vehicle economic loss (recorded as Cdangerous) caused by the dangerous vehicle and a historical average vehicle economic loss (recorded as Cgeneral) caused by the non-dangerous vehicle.

Because traffic accidents caused by dangerous vehicles are usually more serious and cause heavier economic losses, to ensure that the economic losses caused by the dangerous vehicles do not exceed a historical level, traffic warning may be performed in comprehensive consideration of historical economic losses caused by the dangerous vehicles.

For example, a ratio of the corrected potential collision strength of the dangerous vehicle against the first vehicle to the potential collision strength of the non-dangerous vehicle against the first vehicle may be determined as a first ratio, namely, Edangerous/Egeneral; a ratio of the historical average vehicle economic loss caused by the dangerous vehicle to the historical average vehicle economic loss caused by the non-dangerous vehicle may be determined as a second ratio, namely, Cdangerous/Cgeneral; and if the first ratio is greater than the second ratio, namely, Edangerous/Egeneral>>dangerous/Cgeneral, the warning information is outputted.

The historical average vehicle economic loss Cdangerous caused by the dangerous vehicle and the historical average vehicle economic loss Cgeneral caused by the non-dangerous vehicle may be obtained from the road surveillance server (or a traffic management platform or a road management cloud platform). In certain embodiment(s), the road surveillance server may count economic losses of traffic accidents caused by the dangerous vehicle historically, and perform averaging according to a total economic loss and a total number of traffic accidents, to obtain Cdangerous; and count economic losses of traffic accidents caused by the non-dangerous vehicle historically, and perform averaging according to a total economic loss and a total number of traffic accidents, to obtain Cgeneral.

Table 1 is a comparison table of a missing alarm rate and a false alarm rate of traffic warning in certain existing art and a missing alarm rate and a false alarm rate of the traffic warning based on the embodiments of the present disclosure.

TABLE 1

| Experimental sequence | Missing alarm rate in certain exiting art | Missing alarm rate based on the embodiments of the present disclosure | False alarm rate in certain existing art | False alarm rate based on the embodiments of the present disclosure |
|---|---|---|---|---|
| First experiment | 23% | 7% | 23% | 8% |
| Second experiment | 24% | 4% | 23% | 7% |
| Third experiment | 24% | 4% | 26% | 5% |
| Fourth experiment | 25% | 6% | 23% | 6% |
| Fifth experiment | 26% | 5% | 27% | 5% |
| Sixth experiment | 25% | 8% | 22% | 6% |
| Seventh experiment | 26% | 7% | 22% | 7% |
| Eighth experiment | 27% | 6% | 25% | 8% |
| Ninth experiment | 24% | 9% | 27% | 7% |
| Tenth experiment | 27% | 6% | 26% | 7% |

It can be seen from Table 1 that, the traffic warning method in the embodiments of the present disclosure obviously reduces the missing alarm rate, reduces traffic accidents caused by missing alarms, and reduces the false alarm rate, thereby improving user experience.

According to the traffic warning method in the embodiments of the present disclosure, potential collision strength of a dangerous vehicle can be estimated according to driving status information of the dangerous vehicle, the potential collision strength of the dangerous vehicle can be further corrected according to a difference between a performance parameter of the dangerous vehicle and a performance parameter of a non-dangerous vehicle, and traffic warning can be performed according to the corrected potential collision strength of the dangerous vehicle. In this way, the warning accuracy can be improved, and the false alarm rate can be reduced.

Figure 4:
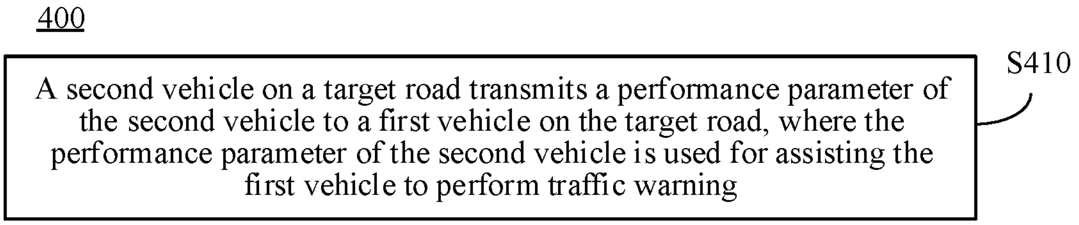
FIG. 4 is a schematic flowchart of a traffic warning method according to certain embodiment(s) of the present disclosure.

FIG. 4 shows a traffic warning method according to another embodiment of the present disclosure. As shown in FIG. 4, a method 400 includes the following step.

S410. A second vehicle on a target road transmits a performance parameter of the second vehicle to a first vehicle on the target road, where the performance parameter of the second vehicle is used for assisting the first vehicle to perform traffic warning.

In certain embodiment(s), an execution body of the method 400 may be, for example, a computing device on the second vehicle, for example, an in-vehicle computer, or may be a computing device capable of performing information interaction with the second vehicle. The present disclosure is not limited thereto.

In this embodiment of the present disclosure, the first vehicle and the second vehicle may be any vehicle on the target road. After driving to the target road, the second vehicle may transmit the performance parameter of the second vehicle to another vehicle on the target road, such as the first vehicle, so that the first vehicle estimates potential collision strength of the second vehicle against the first vehicle according to the performance parameter, and further performs traffic warning.

For a specific implementation, reference may be made to related descriptions in the method embodiments shown in FIG. 2 and FIG. 3, and details are not described herein again.

In some embodiments, the performance parameter of the second vehicle includes at least one of the following: positioning accuracy of the second vehicle, a communication delay of the second vehicle relative to the first vehicle, driving status information of the second vehicle and a total information amount of the driving status information, or a used duration and a specified service life of the second vehicle.

In certain embodiment(s), in some embodiments, the method 400 includes: transmitting, by the second vehicle, first information to the first vehicle, where the first information includes a first timestamp, and the first timestamp is a moment when the second vehicle transmits the first information; receiving, by the second vehicle, second information transmitted by the first vehicle, where the second information includes a second timestamp and a third timestamp, the second timestamp is a moment when the first vehicle receives the first information, and the third timestamp is a moment when the first vehicle transmits the second information; and determining, by the second vehicle, the communication delay of the second vehicle relative to the first vehicle according to the first timestamp, the second timestamp, the third timestamp, and a fourth timestamp, where the fourth timestamp is a moment when the second vehicle receives the second information.

For a specific implementation, reference is made to related descriptions in the embodiments shown in FIG. 3, and details are not described herein again.

Method embodiments of the present disclosure are described above in detail with reference to FIG. 2 to FIG. 4, and apparatus embodiments of the present disclosure are described below in detail with reference to FIG. 5 to FIG. 9. It is to be understood that, the apparatus embodiments and the method embodiments correspond to each other. For similar descriptions, reference may be made to the method embodiments.

Figure 5:
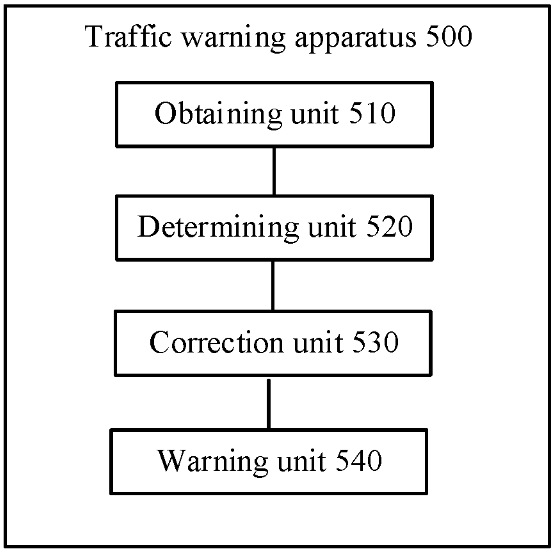
FIG. 5 is a schematic structural diagram of a traffic warning apparatus according to certain embodiment(s) of the present disclosure.

FIG. 5 is a schematic structural diagram of a traffic warning apparatus according to an embodiment of the present disclosure. As shown in FIG. 5, a traffic warning apparatus 500 may include: an obtaining unit 510, configured to obtain driving status information of a dangerous vehicle on a target road and pavement status information of the target road; a determining unit 520, configured to determine potential collision strength of the dangerous vehicle against a first vehicle according to driving status information of the first vehicle on the target road, the driving status information of the dangerous vehicle, and the pavement status information of the target road; a correction unit 530, configured to correct the potential collision strength of the dangerous vehicle against the first vehicle according to a difference between a performance parameter of the dangerous vehicle and a performance parameter of a non-dangerous vehicle on the target road; and a warning unit 540, configured to perform traffic warning according to the corrected potential collision strength of the dangerous vehicle against the first vehicle.

In certain embodiment(s), in some embodiments, the traffic warning apparatus 500 may be disposed in the first vehicle, or the traffic warning apparatus 500 is a third-party device capable of performing information interaction with the first vehicle.

As an example, the traffic warning apparatus 500 may be, for example, an in-vehicle terminal, and includes, but is not limited to, a computer, or the like.

In certain embodiment(s), in some embodiments, the determining unit 520 is further configured to: determine the performance parameter of the dangerous vehicle on the target road, and determine the performance parameter of the non-dangerous vehicle on the target road, where the performance parameter of the dangerous vehicle includes at least one of the following: positioning accuracy of the dangerous vehicle, a communication delay of the dangerous vehicle relative to the first vehicle, integrity of the driving status information of the dangerous vehicle obtained by the first vehicle, or a health degree of the dangerous vehicle; and the performance parameter of the non-dangerous vehicle includes at least one of the following: positioning accuracy of the non-dangerous vehicle, a communication delay of the non-dangerous vehicle relative to the first vehicle, or integrity of driving status information of the non-dangerous vehicle obtained by the first vehicle.

In certain embodiment(s), in some embodiments, when the performance parameter of the dangerous vehicle includes the communication delay of the dangerous vehicle relative to the first vehicle, the traffic warning apparatus 500 further includes: a communication unit, configured to receive first information transmitted by the dangerous vehicle, where the first information includes a first timestamp, and the first timestamp is a moment when the dangerous vehicle transmits the first information; transmit second information to dangerous vehicle, where the second information includes a second timestamp and a third timestamp, the second timestamp is a moment when the first vehicle receives the first information, and the third timestamp is a moment when the first vehicle transmits the second information; and receive communication delay information of the dangerous vehicle relative to the first vehicle that is transmitted by the dangerous vehicle, where the communication delay information is determined according to the first timestamp, the second timestamp, the third timestamp, and a fourth timestamp, and the fourth timestamp is a moment when the dangerous vehicle receives the second information.

In certain embodiment(s), in some embodiments, when the performance parameter of the dangerous vehicle includes the integrity of the driving status information of the dangerous vehicle obtained by the first vehicle, the traffic warning apparatus 500 further includes: a communication unit, configured to receive the driving status information transmitted by the dangerous vehicle and a first information amount, where the first information amount is a total information amount of the driving status information transmitted by the dangerous vehicle; and the determining unit 520 is further configured to: determine, according to the received information amount of the driving status information transmitted by the dangerous vehicle and the first information amount, the integrity of the driving status information of the dangerous vehicle received by the first vehicle.

In certain embodiment(s), in some embodiments, when the performance parameter of the non-dangerous vehicle includes the integrity of the driving status information of the non-dangerous vehicle obtained by the first vehicle, the traffic warning apparatus 500 further includes: a communication unit, configured to receive the driving status information transmitted by the non-dangerous vehicle and a second information amount, where the second information amount is a total information amount of the driving status information transmitted by the non-dangerous vehicle; and the determining unit 520 is further configured to: determine, according to the received information amount of the driving status information transmitted by the non-dangerous vehicle and the second information amount, the integrity of the driving status information of the non-dangerous vehicle received by the first vehicle.

In certain embodiment(s), in some embodiments, when the performance parameter of the dangerous vehicle includes the health degree of the dangerous vehicle, the traffic warning apparatus 500 further includes: a communication unit, configured to receive a used duration and a specified service life transmitted by the dangerous vehicle; and the determining unit 520 is further configured to: determine a current health degree of the dangerous vehicle according to the used duration and the specified service life of the dangerous vehicle.

In certain embodiment(s), in some embodiments, the determining unit 520 is configured to: determine a current health degree of the dangerous vehicle according to the following formula:

$$P_{dangerous}=e^{-T_{already}/T_{specified}}$$

where, Pdangerous represents the current health degree of the dangerous vehicle, Talready represents the used duration of the dangerous vehicle, and Tspecified represents the specified service life of the dangerous vehicle.

In certain embodiment(s), in some embodiments, the correction unit 530 is further configured to: correct the potential collision strength of the dangerous vehicle against the first vehicle according to at least one of a difference between the positioning accuracy of the dangerous vehicle and the positioning accuracy of the non-dangerous vehicle, a difference between the communication delay of the dangerous vehicle and the communication delay of the non-dangerous vehicle respectively relative to the first vehicle, a difference between the integrity of the driving status information of the dangerous vehicle and the integrity of the driving status information of the non-dangerous vehicle, or the health degree of the dangerous vehicle.

In certain embodiment(s), in some embodiments, the correction unit 530 is configured to: correct the potential collision strength of the dangerous vehicle against the first vehicle according to the following formula:

$$E_{dangerous}=\frac{E_{initial}}{p_{dangerous}}\cdot\frac{g_{general}}{g_{dangerous}}\cdot\frac{\Delta t_{general}}{\Delta t_{dangerous}}\cdot\frac{\Delta n_{general}}{\Delta n_{dangerous}}$$

where, $E_{dangerous}$ is the corrected potential collision strength of the dangerous vehicle against the first vehicle, $E_{initial}$ is the potential collision strength of the dangerous vehicle against the first vehicle before correction, $p_{dangerous}$ is the health degree of the dangerous vehicle, is the $g_{general}$ positioning accuracy of the non-dangerous vehicle, $g_{dangerous}$ is the positioning accuracy of the dangerous vehicle, $\Delta t_{general}$ is the communication delay of the non-dangerous vehicle relative to the first vehicle, $\Delta t_{dangerous}$ is the communication delay of the dangerous vehicle relative to the first vehicle, $\Delta n_{general}$ is the information integrity of the driving status information of the non-dangerous vehicle, and $\Delta n_{dangerous}$ is the information integrity of the driving status information of the dangerous vehicle.

In certain embodiment(s), in some embodiments, the warning unit 540 is configured to: perform traffic warning according to a difference between the corrected potential collision strength of the dangerous vehicle against the first vehicle and potential collision strength of the non-dangerous vehicle against the first vehicle and a difference between a historical average vehicle economic loss caused by the dangerous vehicle and a historical average vehicle economic loss caused by the non-dangerous vehicle.

In certain embodiment(s), in some embodiments, the warning unit 540 is configured to: determine a ratio of the corrected potential collision strength of the dangerous vehicle against the first vehicle to the potential collision strength of the non-dangerous vehicle against the first vehicle as a first ratio; determine a ratio of the historical average vehicle economic loss caused by the dangerous vehicle to the historical average vehicle economic loss caused by the non-dangerous vehicle as a second ratio; and output warning information when or in response to a determination that the first ratio is greater than the second ratio.

In certain embodiment(s), in some embodiments, the determining unit 520 is configured to: determine the potential collision strength of the dangerous vehicle against the first vehicle by using a driving risk calculation model according to the driving status information of the first vehicle, the driving status information of the dangerous vehicle, and the pavement status information of the target road.

In certain embodiment(s), in some embodiments, the determining unit 520 is further configured to: determine the potential collision strength of the non-dangerous vehicle against the first vehicle by using the driving risk calculation model according to the driving status information of the first vehicle, the driving status information of the non-dangerous vehicle, and the pavement status information of the target road.

In certain embodiment(s), in some embodiments, the driving status information of the dangerous vehicle includes at least one of the following: mass, a speed, an acceleration, or a position of the dangerous vehicle.

In certain embodiment(s), in some embodiments, the pavement status information of the target road includes at least one of the following: pavement viscosity, a pavement friction coefficient, road curvature, or visibility of the target road.

Functions of various units in the traffic warning apparatus 500 provided in the embodiments of the present disclosure may correspond to specific implementations of any embodiment in FIG. 2 and FIG. 3 in the above method embodiments, and details are not described herein again. The traffic warning apparatus 500 may be, for example, an in-vehicle terminal, and includes, but is not limited to, a computer, or the like.

Figure 6:
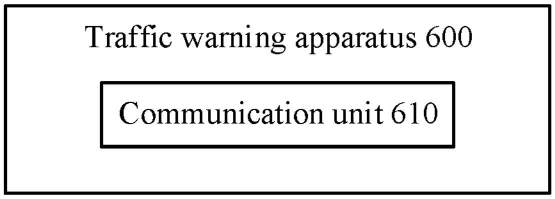
FIG. 6 is a schematic structural diagram of a traffic warning apparatus according to certain embodiment(s) of the present disclosure.

FIG. 6 is a schematic structural diagram of a traffic warning apparatus according to an embodiment of the present disclosure. A traffic warning apparatus 600 may be disposed in a second vehicle, or the traffic warning apparatus 600 is a third-party device capable of performing information interaction with the second vehicle.

As shown in FIG. 6, the traffic warning apparatus 600 may include: a communication unit 610, configured to transmit a performance parameter of the second vehicle to a first vehicle, where the performance parameter of the second vehicle is used for assisting the first vehicle to perform traffic warning; and the performance parameter includes at least one of the following: positioning accuracy of the second vehicle, a communication delay of the second vehicle relative to the first vehicle, driving status information of the second vehicle and a total information amount of the driving status information, or a used duration and a specified service life of the second vehicle.

Functions of various units in the traffic warning apparatus 600 provided in the embodiments of the present disclosure may correspond to specific implementations of the embodiment in FIG. 4, and details are not described herein again. As an example, the traffic warning apparatus 600 may be, for example, an in-vehicle terminal, and includes, but is not limited to, a computer, or the like.

Figure 7:
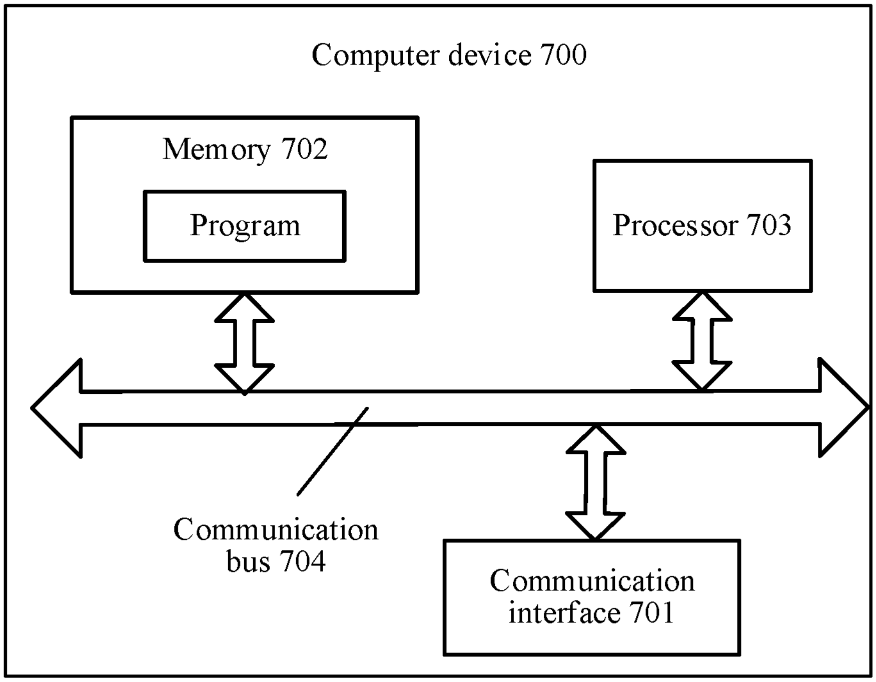
FIG. 7 is a schematic structural diagram of a traffic warning apparatus according to certain embodiment(s) of the present disclosure.

FIG. 7 is a schematic structural diagram of a computing device for traffic warning according to an embodiment of the present disclosure. As shown in FIG. 7, a computing device 700 may include: a communication interface 701, a memory 702, a processor 703, and a communication bus 704. The communication interface 701, the memory 702, and the processor 703 accomplish communication each other by using the communication bus 704. The communication interface 701 is configured to perform data communication between a traffic warning apparatus 700 and an external device. The memory 702 may be configured to store software programs and modules. The processor 703 runs the software programs and modules stored in the memory 702, to perform the software programs of corresponding operations in the method embodiments in FIG. 2 and FIG. 3.

In certain embodiment(s), the processor 703 may invoke the software programs and modules stored in the memory 702, to perform the following operations: obtaining driving status information of a dangerous vehicle on a target road and pavement status information of the target road; determining potential collision strength of the dangerous vehicle against a first vehicle according to driving status information of the first vehicle on the target road, the driving status information of the dangerous vehicle, and the pavement status information of the target road; correcting the potential collision strength of the dangerous vehicle against the first vehicle according to a difference between a performance parameter of the dangerous vehicle and a performance parameter of a non-dangerous vehicle on the target road; and performing traffic warning according to the corrected potential collision strength of the dangerous vehicle against the first vehicle.

Figure 8:
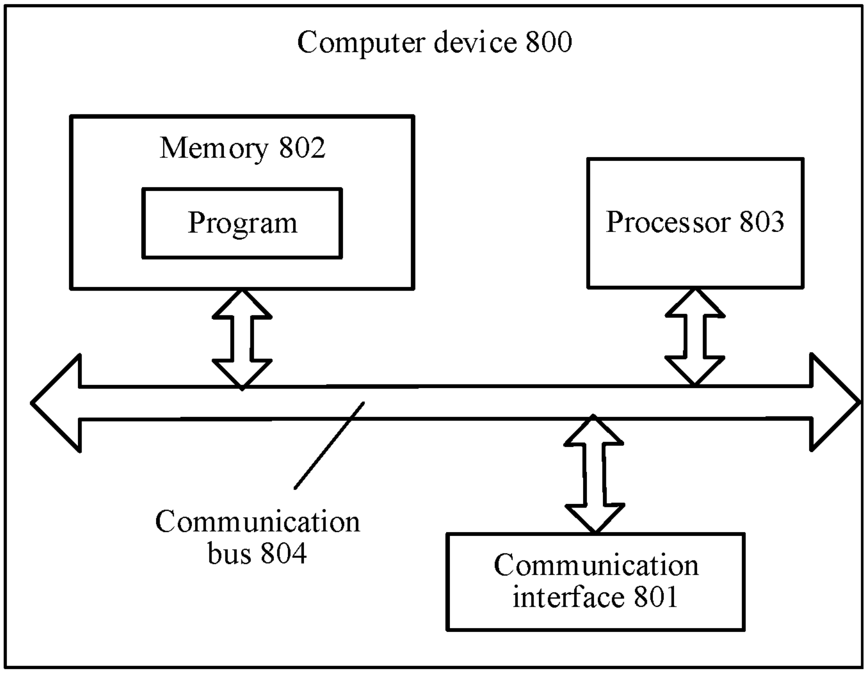
FIG. 8 is a schematic structural diagram of a traffic warning apparatus according to certain embodiment(s) of the present disclosure.

FIG. 8 is still another schematic structural diagram of a computing device for traffic warning according to an embodiment of the present disclosure. As shown in FIG. 8, a computing device 800 may include: a communication interface 801, a memory 802, a processor 803, and a communication bus 804. The communication interface 801, the memory 802, and the processor 803 accomplish communication each other by using the communication bus 804. The communication interface 801 is configured to perform data communication between a traffic warning apparatus 800 and an external device. The memory 802 may be configured to store software programs and modules. The processor 803 runs the software programs and modules stored in the memory 802, to perform the software programs of corresponding operations in the method embodiments in FIG. 4.

In certain embodiment(s), the processor 803 may invoke the software programs and modules stored in the memory 802, and control the communication interface 801 to perform the following operations: transmitting a performance parameter of a vehicle to a first vehicle on a target road, where the performance parameter includes at least one of the following: positioning accuracy, a communication delay of the vehicle relative to the first vehicle, driving status information and a total information amount of the driving status information, or a used duration and a specified service life.

Figure 9:
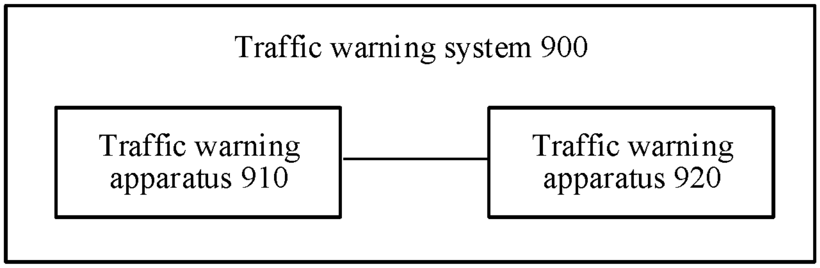
FIG. 9 is a schematic structural diagram of a traffic warning system according to certain embodiment(s) of the present disclosure.

FIG. 9 is a schematic structural diagram of a traffic warning system 900 according to an embodiment of the present disclosure. Referring to FIG. 9, the traffic warning system 900 may include: a traffic warning apparatus 910 and a traffic warning apparatus 920, where the traffic warning apparatus 910 may be the traffic warning apparatus 500 in FIG. 5 or the computing device 700 in FIG. 7, and the traffic warning apparatus 920 may be the traffic warning apparatus 600 in FIG. 6 or the computing device 800 in FIG. 8. For a specific implementation, reference may be made to the above related descriptions, and details are not described herein again.

An embodiment of the present disclosure further provides a computer-readable storage medium, configured to store a computer program. The computer-readable storage medium may be applied to a computing device, and the computer program causes the computing device to perform corresponding procedures of the traffic warning method in the embodiments of the present disclosure. For brevity, details are not described herein again.

A processor of this embodiment of the present disclosure may be an integrated circuit chip, and has a signal processing capability. During implementation, the steps of the method embodiment may be implemented by using a hardware integrated logic circuit in the processor or implemented by using an instruction in a software form. The processor may be a general-purpose processor, a digital signal processor (DSP), an application-specific integrated circuit (ASIC), a field programmable gate array (FPGA), or another programmable logical device, discrete gate or transistor logical device, or discrete hardware component. The processor may implement or perform methods, steps, and logical block diagrams disclosed in the embodiments of the present disclosure. The general-purpose processor may be a microprocessor, or the processor may be any suitable processor or the like. The steps of the methods disclosed with reference to the embodiments of the present disclosure may be directly performed by using a hardware decoding processor, or may be performed by using a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory. The processor reads information in the memory and performs the steps of the methods in combination with hardware thereof.

It can be understood that, the memory in the embodiments of the present disclosure may be a volatile memory or a non-volatile memory, or may include both a volatile memory and a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). The memory for the system and the method described herein aims to include but not limited to these memories and any other suitable types of memories.

The description of the memory is illustrative, but is not limitative. For example, the memory in the embodiments of the present disclosure may alternatively be a static RAM (SRAM), a dynamic RAM (DRAM), a synchronous DRAM (SDRAM), a double data rate SDRAM (DDR SDRAM), an enhanced SDRAM (ESDRAM), a synchlink SDRAM (SL-DRAM), a direct rambus RAM (DR RAM), or the like. That is, the memory described in this embodiment of the present disclosure aims to include, but not limited to, the memories and any other suitable types of memories.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may notice that the exemplary units and algorithm steps described with reference to the embodiments disclosed in the present disclosure can be implemented in electronic hardware, or a combination of computer software and electronic hardware. Whether the functions are executed by hardware or software depends on particular applications and design constraint conditions of the technical solutions. A person skilled in the art may use different methods to implement the described functions for each particular application, but it is not to be considered that the implementation goes beyond the scope of the present disclosure.

Persons skilled in the art can clearly understand that for convenience and conciseness of description, for specific working processes of the described system, apparatus and unit, reference may be made to the corresponding processes in the method embodiments, and details are not described herein.

In the several embodiments provided in the present disclosure, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electric, mechanical, or other forms.

The units described as separate components may or may not be physically separate, and components displayed as units may or may not be physical units, may be located in one position, or may be distributed on a plurality of network units. Some or all of the units may be selected to achieve the objectives of the solutions in the embodiments.

In addition, functional units in the embodiments of the present disclosure may be integrated into one processing unit, or each of the units may be physically separated, or two or more units may be integrated into one unit.

If implemented in the form of software functional units and sold or used as an independent product, the functions may also be stored in a computer-readable storage medium. Based on such an understanding, the technical solutions of the present disclosure essentially, or the part contributing to the prior art, or part of the technical solutions may be implemented in the form of a software product. The computer software product is stored in a storage medium, and includes several instructions for instructing a computing device (which may be a personal computer, a server, a network device, and the like) to perform all or a part of the steps of the method described in the embodiment of the present disclosure. The storage medium includes: any medium that can store program code, such as a USB flash drive, a removable hard disk, a ROM, a RAM, a magnetic disk, a compact disc, or the like.

The descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A traffic warning method, performed by a computing device, the method comprising:

receiving, by the computing device embedded in a host vehicle, driving status information of a peer vehicle on a target road transmitted by the peer vehicle based on a wireless communication protocol, wherein the peer vehicle includes vehicles on the target road and in a vicinity of the host vehicle and is classified into a first type vehicle and a second type vehicle, the first type vehicle comprising at least one of: a chartered vehicle engaged in tourism, a bus-line vehicle, or a road vehicle for transporting hazardous chemicals, fireworks and firecrackers, or civilian explosives, the second type vehicle being a vehicle that is not the charted vehicle engaged in tourism, the bus-line vehicle, or the road vehicle for transporting hazardous chemicals, fireworks and firecrackers, or civilian explosives;

obtaining pavement status information of the target road;

determining potential collision strength of the peer vehicle against the host vehicle according to driving status information of the host vehicle on the target road, the driving status information of the peer vehicle, and the pavement status information of the target road, wherein a determination model for the potential collision strength of the first type vehicle being the same as a determination model for a potential collision strength of the second type vehicle;

updating the potential collision strength of the first type vehicle against the host vehicle according to a difference between a performance parameter of the first type vehicle and a performance parameter of the second type vehicle on the target road, to obtain a corrected collision strength of the first type vehicle against the host vehicle; and performing traffic warning according to the corrected potential collision strength of the first type vehicle against the host vehicle, wherein the potential collision strength of the first type vehicle against the host vehicle is updated based on at least a difference between a communication delay between the first type vehicle and the host vehicle and a communication delay between the second type vehicle and the host vehicle, and the communication delay between the host first vehicle and the peer vehicle is obtained by:

receiving, by the host vehicle, first information from the peer vehicle, the first information including a first timestamp indicating a moment that the peer vehicle transmits the first message;

transmitting, by the host vehicle, second information to the peer vehicle, the second information including a second timestamp indicating a moment when the host vehicle receives the first information and a third timestamp indicating a transmitting moment of the second information; and receiving, by the host vehicle, a communication delay from the peer vehicle, the communication delay being determined based on the first timestamp, the second timestamp, and the third timestamp, wherein: after the corrected potential collision strength of the first type vehicle against the host vehicle is obtained by updating the potential collision strength of the first type vehicle against the host vehicle based on the communication delay between the first type vehicle and the host vehicle, in response to the corrected potential collision strength being greater than the first threshold, the traffic warning is performed; and in response to the corrected potential collision strength being not greater than the first threshold, the traffic warning is not performed.

2. The method according to claim 1, further comprising:

determining the performance parameter of the first type vehicle, and determining the performance parameter of the second type vehicle, wherein the performance parameter of the first type vehicle comprises at least one of the following:

positioning accuracy of the first type vehicle, the communication delay of the first type vehicle relative to the host vehicle, integrity of the driving status information of the first type vehicle obtained by the host first vehicle, or a health degree of the first type dangerous vehicle, integrity of the driving status information being determined based on a total information amount of information transmitted by the first type vehicle, and the health degree being evaluated based on information about a used duration and a specified service life of the first type vehicle; and the performance parameter of the second type vehicle comprises one or more of:

positioning accuracy of the second type vehicle, the communication delay of the second type vehicle relative to the host first vehicle, or integrity of driving status information of the second type vehicle obtained by the host first vehicle.

3. The method according to claim 2, wherein in response to a determination that the performance parameter of the first type vehicle includes the integrity of the driving status information of the first type vehicle obtained by the host vehicle, determining the performance parameter comprises:

receiving, by the host vehicle, the driving status information transmitted by the first type vehicle and a first information amount, wherein the first information amount is a total information amount of the driving status information transmitted by the first type vehicle; and determining, by the host vehicle according to the received information amount of the driving status information transmitted by the first type vehicle and the first information amount, the integrity of the driving status information of the first type vehicle received by the host first vehicle; and in response to a determination that the performance parameter of the second type vehicle includes the integrity of the driving status information of the second type vehicle obtained by the host vehicle, determining the performance parameter of the second type vehicle comprises:

receiving, by the host vehicle, the driving status information transmitted by the second type vehicle and a second information amount, wherein the second information amount is a total information amount of the driving status information transmitted by the second type vehicle; and determining, by the host vehicle according to the received information amount of the driving status information transmitted by the second type vehicle and the second information amount, the integrity of the driving status information of the second type vehicle received by the host first vehicle.

4. The method according to claim 3, wherein: the integrity of the driving status information of the second type vehicle received by the host vehicle is determined as a ratio of the received information amount of the driving status information transmitted by the second type vehicle to the second information amount measured in bits.

5. The method according to claim 2, wherein in response to a determination that the performance parameter of the first type vehicle includes the health degree of the first type vehicle, the determining the performance parameter of the first type vehicle on the target road comprises:

receiving the used duration and the specified service life transmitted by the first type vehicle; and determining a current health degree of the first type vehicle according to the used duration and the specified service life of the first type vehicle.

6. The method according to claim 2, wherein updating the potential collision strength of the first type vehicle against the host vehicle comprises:

updating the potential collision strength of the first type vehicle against the host vehicle according to the difference between the communication delay between the first type vehicle and the host vehicle and the communication delay between the second type vehicle and the host vehicle and at least one of a difference between the positioning accuracy of the first type vehicle and the positioning accuracy of the second type vehicle, a difference between the integrity of the driving status information of the first type vehicle and the integrity of the driving status information of the second type vehicle, or the health degree of the first type vehicle.

7. The method according to claim 1, wherein performing the traffic warning comprises:

performing traffic warning according to a difference between the corrected potential collision strength of the first type vehicle against the host vehicle and potential collision strength of the second type vehicle against the host vehicle and a difference between a historical average economic loss associated with traffic accidents caused by the first type vehicle and a historical average economic loss associated with traffic accidents caused by the second type vehicle.

8. The method according to claim 7, wherein performing the traffic warning comprises:

determining a ratio of the corrected potential collision strength of the first type vehicle against the host vehicle to the potential collision strength of the second type vehicle against the host vehicle as a first ratio; determining a ratio of the historical average vehicle economic loss caused by the first type vehicle to the historical average vehicle economic loss caused by the second type vehicle as a second ratio; and outputting warning information in response to a determination that the first ratio is greater than the second ratio.

9. The method according to claim 1, wherein determining the potential collision strength comprises:

determining the potential collision strength of the first type vehicle against the host vehicle by using a driving risk calculation model according to the driving status information of the host vehicle, the driving status information of the first type vehicle, and the pavement status information of the target road.

10. The method according to claim 1, wherein the driving status information of the first type vehicle includes one or more of:

mass, a speed, an acceleration, or a position of the first type vehicle.

11. The method according to claim 1, wherein the pavement status information of the target road includes one or more of:

pavement viscosity, a pavement friction coefficient, road curvature, or visibility of the target road.

12. A traffic warning apparatus, comprising: a memory storing computer program instructions; and a processor coupled to the memory and configured to execute the computer program instructions and perform:

receiving, by the processor embedded in a host vehicle, driving status information of a peer vehicle on a target road transmitted by the peer vehicle based on a wireless communication protocol, wherein the peer vehicle includes vehicles on the target road and in a vicinity of the host vehicle and is classified into a first type vehicle and a second type vehicle, the first type vehicle comprising at least one of: a chartered vehicle engaged in tourism, a bus-line vehicle, or a road vehicle for transporting hazardous chemicals, fireworks and firecrackers, or civilian explosives, the second type vehicle being a vehicle that is not the charted vehicle engaged in tourism, the bus-line vehicle, or the road vehicle for transporting hazardous chemicals, fireworks and firecrackers, or civilian explosives;

obtaining pavement status information of the target road;

determining potential collision strength of the peer vehicle against the host vehicle according to driving status information of the host vehicle on the target road, the driving status information of the peer vehicle, and the pavement status information of the target road, wherein a determination model for the potential collision strength of the first type vehicle being the same as a determination model for a potential collision strength of the second type vehicle;

updating the potential collision strength of the first type vehicle against the host vehicle according to a difference between a performance parameter of the first type vehicle and a performance parameter of the second type vehicle on the target road, to obtain a corrected collision strength of the first type vehicle against the host vehicle; and performing traffic warning according to the corrected potential collision strength of the first type vehicle against the host vehicle, wherein the potential collision strength of the first type vehicle against the host vehicle is updated based on at least a difference between a communication delay between the first type vehicle and the host vehicle and a communication delay between the second type vehicle and the first vehicle, and the communication delay between the host vehicle and the peer vehicle is obtained by:

receiving, by the host vehicle, first information from the peer vehicle, the first information including a first timestamp indicating a moment that the peer vehicle transmits the first message;

transmitting, by the host vehicle, second information to the peer vehicle, the second information including a second timestamp indicating a moment when the host vehicle receives the first information and a third timestamp indicating a transmitting moment of the second information; and receiving, by the host vehicle, a communication delay from the peer vehicle, the communication delay being determined based on the first timestamp, the second timestamp, and the third timestamp, wherein: after the corrected potential collision strength of the first type vehicle against the host vehicle is obtained by updating the potential collision strength of the first type vehicle against the host vehicle based on the communication delay between the first type vehicle and the host vehicle, in response to the corrected potential collision strength being greater than the first threshold, the traffic warning is performed; and in response to the corrected potential collision strength being not greater than the first threshold, the traffic warning is not performed.

13. The traffic warning apparatus according to claim 12, wherein the processor is further configured to execute the computer program instructions and perform:

determining the performance parameter of the first type vehicle, and determining the performance parameter of the second type vehicle, wherein the performance parameter of the first type vehicle comprises at least one of the following:

positioning accuracy of the first type vehicle, the communication delay of the first type vehicle relative to the host vehicle, integrity of the driving status information of the first type vehicle obtained by the host vehicle, or a health degree of the first type vehicle, integrity of the driving status information being determined based on a total information amount of information transmitted by the first type vehicle, and the health degree being evaluated based on about a used duration and a specified service life of the first type vehicle; and the performance parameter of the second type vehicle comprises one or more of:

positioning accuracy of the second type vehicle, a communication delay of the second type vehicle relative to the host vehicle, or integrity of driving status information of the second type vehicle obtained by the host vehicle.

14. The traffic warning apparatus according to claim 13, wherein in response to a determination that the performance parameter of the first type vehicle includes the integrity of the driving status information of the first type vehicle obtained by the host vehicle, determining the performance parameter includes:

receiving, by the host vehicle, the driving status information transmitted by the first type vehicle and a first information amount, wherein the first information amount is a total information amount of the driving status information transmitted by the first type vehicle; and determining, by the host vehicle according to the received information amount of the driving status information transmitted by the first type vehicle and the first information amount, the integrity of the driving status information of the first type vehicle received by the host vehicle; and in response to a determination that the performance parameter of the second type vehicle includes the integrity of the driving status information of the second type vehicle obtained by the host vehicle, determining the performance parameter of the second type vehicle includes:

receiving, by the host vehicle, the driving status information transmitted by the second type vehicle and a second information amount, wherein the second information amount is a total information amount of the driving status information transmitted by the second type vehicle; and determining, by the host vehicle according to the received information amount of the driving status information transmitted by the second type vehicle and the second information amount, the integrity of the driving status information of the second type vehicle received by the host vehicle.

15. The traffic warning apparatus according to claim 13, wherein in response to a determination that the performance parameter of the first type vehicle includes the health degree of the first type vehicle, the determining the performance parameter of the first type vehicle on the target road includes:

receiving the used duration and the specified service life transmitted by the first type vehicle; and determining a current health degree of the first type vehicle according to the used duration and the specified service life of the first type vehicle.

16. The traffic warning apparatus according to claim 13, wherein updating the potential collision strength of the first type vehicle against the host vehicle comprises:

updating the potential collision strength of the first type vehicle against the host vehicle according to the difference between the communication delay between the first type vehicle and the host vehicle and the communication delay between the second type vehicle and the host vehicle and at least one of a difference between the positioning accuracy of the first type vehicle and the positioning accuracy of the second type vehicle, a difference between the integrity of the driving status information of the first type vehicle and the integrity of the driving status information of the second type vehicle, or the health degree of the first type vehicle.

17. The traffic warning apparatus according to claim 12, wherein performing the traffic warning includes:

performing traffic warning according to a difference between the corrected potential collision strength of the first type vehicle against the host vehicle and potential collision strength of the second type vehicle against the host vehicle and a difference between a historical average economic loss associated with traffic accidents caused by the first type vehicle and a historical average economic loss associated with traffic accidents caused by the second type vehicle.

18. The traffic warning apparatus according to claim 17, wherein performing the traffic warning includes:

determining a ratio of the corrected potential collision strength of the first type vehicle against the host vehicle to the potential collision strength of the second type vehicle against the host vehicle as a first ratio; determining a ratio of the historical average vehicle economic loss caused by the first type vehicle to the historical average vehicle economic loss caused by the second type vehicle as a second ratio; and outputting warning information in response to a determination that the first ratio is greater than the second ratio.

19. A non-transitory computer-readable storage medium storing computer program instructions executable by at least one processor to perform:

receiving, by the at least one processor embedded in a host vehicle, driving status information of a peer vehicle on a target road transmitted by the peer vehicle based on a wireless communication protocol, wherein the peer vehicle includes vehicles on the target road and in a vicinity of the host vehicle and is classified into a first type vehicle and a second type vehicle, the first type vehicle comprising at least one of: a chartered vehicle engaged in tourism, a bus-line vehicle, or a road vehicle for transporting hazardous chemicals, fireworks and firecrackers, or civilian explosives, the second type vehicle being a vehicle that is not the charted vehicle engaged in tourism, the bus-line vehicle, or the road vehicle for transporting hazardous chemicals, fireworks and firecrackers, or civilian explosives;

obtaining pavement status information of the target road;

determining potential collision strength of the peer vehicle against the host vehicle according to driving status information of the host vehicle on the target road, the driving status information of the peer vehicle, and the pavement status information of the target road, wherein a determination model for the potential collision strength of the first type vehicle being the same as a determination model for a potential collision strength of the second type vehicle;

updating the potential collision strength of the first type vehicle against the host vehicle according to a difference between a performance parameter of the first type vehicle and a performance parameter of the second type vehicle on the target road, to obtain a corrected collision strength of the first type vehicle against the host vehicle; and performing traffic warning according to the corrected potential collision strength of the first type vehicle against the host vehicle, wherein the potential collision strength of the first type vehicle against the host vehicle is updated based on at least a difference between a communication delay between the first type vehicle and the host first vehicle and a communication delay between the second type vehicle and the host vehicle, and the communication delay between the host vehicle and the peer vehicle is obtained by:

receiving, by the host vehicle, first information from the peer vehicle, the first information including a first timestamp indicating a moment that the peer vehicle transmits the first message;

transmitting, by the host vehicle, second information to the peer vehicle, the second information including a second timestamp indicating a moment when the first vehicle receives the first information and a third timestamp indicating a transmitting moment of the second information; and receiving, by the host vehicle, a communication delay from the peer vehicle, the communication delay being determined based on the first timestamp, the second timestamp, and the third timestamp, wherein: after the corrected potential collision strength of the first type vehicle against the host vehicle is obtained by updating the potential collision strength of the first type vehicle against the host vehicle based on the communication delay between the first type vehicle and the host vehicle, in response to the corrected potential collision strength being greater than the first threshold, the traffic warning is performed; and in response to the corrected potential collision strength being not greater than the first threshold, the traffic warning is not performed.

* * * * *